(12) United States Patent
Oh et al.

(10) Patent No.: US 6,608,881 B2
(45) Date of Patent: Aug. 19, 2003

(54) DUCT-TYPE SPACER GRID WITH SWIRL FLOW VANE FOR NUCLEAR FUEL ASSEMBLY

(75) Inventors: Dong-Seok Oh, Taejon-si (KR); Tae-Hyun Chun, Taejon-si (KR); Wang-Kee In, Taejon-si (KR); Kee-Nam Song, Taejon-si (KR); Hyung-Kyu Kim, Taejon-si (KR); Heung-Seok Kang, Taejon-si (KR); Kyung-Ho Yoon, Taejon-si (KR); Youn-Ho Jung, Taejon-si (KR)

(73) Assignees: Korea Atomic Energy Research Institute, Taejon-si (KR); Korea Electric Power Corporation, Seoul (KR)

( * ) Notice: Subject to any disclaimer, the term of this patent is extended or adjusted under 35 U.S.C. 154(b) by 82 days.

(21) Appl. No.: 10/116,319

(22) Filed: Apr. 3, 2002

(65) Prior Publication Data

US 2002/0136349 A1 Sep. 26, 2002

Related U.S. Application Data

(62) Division of application No. 09/439,713, filed on Nov. 12, 1999, now Pat. No. 6,393,087.

(30) Foreign Application Priority Data

Jun. 4, 1999 (KR) ............................................. 99-20633

(51) Int. Cl.[7] ............................ G21C 3/34; G21C 3/356
(52) U.S. Cl. ....................... 376/439; 376/438; 376/442; 376/462
(58) Field of Search ................................ 376/434, 438, 376/439, 442, 462

(56) References Cited

U.S. PATENT DOCUMENTS

| | | | | | |
|---|---|---|---|---|---|
| 3,457,140 | A | * | 7/1969 | Glandin | 176/78 |
| 4,190,494 | A | * | 2/1980 | Olsson | 176/76 |
| 4,426,355 | A | * | 1/1984 | Burger | 376/442 |
| 4,571,324 | A | * | 2/1986 | Johansson et al. | 376/441 |
| 4,597,937 | A | * | 7/1986 | Sakurai et al. | 376/441 |
| 4,726,926 | A | * | 2/1988 | Patterson et al. | 376/439 |
| 4,735,769 | A | * | 4/1988 | Lettau | 376/441 |
| 4,780,273 | A | * | 10/1988 | Dressel | 376/441 |
| 4,803,043 | A | * | 2/1989 | DeMario et al. | 376/442 |
| 4,879,090 | A | * | 11/1989 | Perrotti et al. | 376/462 |
| 4,888,152 | A | * | 12/1989 | Razafindrazaka | 376/462 |
| 5,089,221 | A | * | 2/1992 | Johansson et al. | 376/442 |

(List continued on next page.)

FOREIGN PATENT DOCUMENTS

| | | | | |
|---|---|---|---|---|
| EP | 210526 | * | 2/1987 | 376/438 |
| EP | 562859 | * | 9/1993 | 376/438 |

Primary Examiner—Michael J. Carone
Assistant Examiner—Jack Keith
(74) Attorney, Agent, or Firm—Bachman & LaPointe, P.C.

(57) ABSTRACT

A duct-type spacer grid for nuclear fuel assemblies is disclosed. In this spacer grid, a plurality of duct-shaped grid elements, individually having an octagonal cell, are closely arranged in parallel and are welded together, thus forming a matrix structure. The grid elements do not pass across the center of the subchannel of the assembly, thus effectively reducing pressure loss. Each of the grid elements is formed as an independent cell, and so they effectively resist against a lateral impact. A plurality of integral type swirl flow vanes, having different heights or same height, axially extend from the top of the grid to be positioned within each subchannel. The swirl flow vanes are bent outwardly, and so they do not contact the fuel rods during an insertion of the fuel rods into the cells. In the spacer grid, the fuel rods are supported within the cells by line contact springs without using any dimple. The spacer grid thus uniformly distributes its spring force on the fuel rods and almost completely prevents damage of the fuel rods due to fretting wear.

10 Claims, 14 Drawing Sheets

U.S. PATENT DOCUMENTS

| | | | | |
|---|---|---|---|---|
| 5,110,539 A | * | 5/1992 | Perrotti et al. | 376/439 |
| 5,186,891 A | * | 2/1993 | Johansson et al. | 376/438 |
| 5,299,245 A | * | 3/1994 | Aldrich et al. | 376/439 |
| 5,327,472 A | * | 7/1994 | Kraemer et al. | 376/439 |
| 5,331,679 A | * | 7/1994 | Hirukawa | 376/439 |
| 5,361,288 A | * | 11/1994 | Johansson | 376/441 |
| 5,375,154 A | * | 12/1994 | Matzner et al. | 376/441 |
| 5,440,599 A | * | 8/1995 | Rodack et al. | 376/439 |
| 5,519,747 A | * | 5/1996 | Johansson et al. | 376/442 |
| 5,740,218 A | * | 4/1998 | Frederickson et al. | 376/442 |

* cited by examiner

DUCT-TYPE SPACER GRID WITH SWIRL FLOW VANE FOR NUCLEAR FUEL ASSEMBLY

CROSS-REFERENCE TO RELATED APPLICATION

The instant application is a divisional of U.S. application Ser. No. 09/439,713 filed Nov. 12, 1999, now U.S. Pat. No. 6,393,087.

BACKGROUND OF THE INVENTION

1. Field of the Invention

The present invention relates, in general, to a spacer grid used for placing and supporting a plurality of nuclear fuel rods within a nuclear fuel assembly and, more particularly, to a duct-type spacer grid consisting of a plurality of duct-shaped grid elements individually having an octagonal cross-section. The grid is also designed to have a plurality of swirl flow vanes at the top of each grid element.

2. Description of the Prior Art

As shown in FIG. 1, a conventional nuclear fuel assembly 100 typically comprises a plurality of spacer grids 110, a bottom nozzle 101, a top nozzle 102, a plurality of guide tubes 103, and a plurality of elongated fuel rods 106.

In the above fuel assembly 100, the elongated fuel rods 106 are regularly and arranged in parallel to form a structure having a square cross-section while being placed and supported by the spacer grids 110. Each of the grids 110 is fabricated by assembling a plurality of intersecting inner strips into an egg-crate pattern. The intersecting inner strips are also welded together at their intersections.

As best seen in FIGS. 2 and 3, a plurality of inner strips 113 intersect each other to form a plurality of four-walled cells 108 having a square cross-section. In each of the four-walled cells 108, two springs 114 are provided on the interior of two neighboring walls, while two dimples 115 are provided on the interior of the opposite two walls. The strength of the two dimples 115 is higher than the two springs 114. Both the two springs 114 and the two dimples 115 are used for supporting an elongated fuel rod 106 within each cell 108.

In the above fuel assembly 100, it is necessary for the springs 114 and the dimples 115 to effectively support the fuel rods 106 while restricting undesirable movement of the rods 106 even when the assembly 100 is impacted by any external force applied in an axial direction A, a radial direction B and/or a rotating direction C. Such an external force, applied to the assembly 100, may be caused by the coolant flow, an earthquake or any unexpected external impact. In addition, the grid structure 111, consisting of the intersecting inner strips 113, has to maintain the originally designed configuration of the cells 108 even when a lateral impact is applied to a sidewall of the grid 110. In the fuel assembly 100, the spring force of the grid 110 may be gradually reduced due to neutron irradiation of the assembly 110. The spacer grid 110 has to be designed to maintain an effective spring force capable of continuing elastic contact of the springs 114 with a fuel rod 106 until the existing rod 106 is changed with a new one.

In the above fuel assembly 100, the fuel rods 106 may be grown in an axial direction A due to the neutron irradiation, and so the grids 110 have to be designed to appropriately support the rods 106 while allowing such an axial growth of the rods 106. However, when the spring force of the grids 110 undesirably exceeds a reference level, the fuel rods 106 may be prevented from being grown in the axial direction A. This sometimes results in a bending of the fuel rods 106. When the fuel rods 106 are undesirably bent as described above, it is difficult to secure a subchannel 107 within the fuel assembly 100. This deteriorates the cooling performance of the assembly 100. FIG. 4 shows a subchannel 107, formed by four fuel rods 106. On the other hand, when the spring force of the grid 110 is less than the reference level, the grids 110 may fail to effectively place or support the fuel rods 106 within the assembly 100. This finally results in vibration or fretting wear of the fuel rods 106, thus severely damaging the rods 106.

As well known to those skilled in the art, the power output from a nuclear reactor is partially used as an energy source for causing the coolant to effectively flow within the reactor core. The amount of power, required to cause the coolant flow within the core, is determined by a hydraulic resistance in the flow paths. In a conventional nuclear fuel assembly 100, the flow paths comprise a main flow path and a sub-flow path. When the flow paths are designed having a shape which disturbs the coolant flow, a large amount of power has to be consumed to cause the coolant flow. On the other hand, when the flow paths are designed having a streamline shape, a small amount of power is needed to cause the coolant flow. It is necessary to make the passages effectively cause the coolant flow using a small amount of power by reducing the hydraulic resistance.

A typical spacer grid for nuclear fuel assemblies, used in light water reactors, may be referred to U.S. Pat. No. 3,395,077. Another conventional spacer grid, having a specifically designed inner strip and a fuel rod support spring, may be referred to U.S. Pat. Nos. 4,426,355, 4,726,926, 4,803,043 or 4,888,152.

In the spacer grid of U.S. Pat. No. 4,426,355, the inner strips are corrugated to form a plurality of wavy dimples at regularly spaced positions. In the spacer grid of U.S. Pat. No. 4,726,926, a plurality of thin and narrow inner strips intersect each other prior to being welded together at their intersections, thus forming a grid structure. After the grid structure is formed by the intersecting inner strips, the strips are appropriately deformed to form a plurality of flow paths, springs and dimples. In the spacer grid of U.S. Pat. No. 4,803,043, the springs of the inner strips are positioned to be diagonally opposite to each other, thus having an increased effective spring length. In the above-mentioned spacer grids, each grid consists of a plurality of intersecting inner strips. In such a spacer grid having the intersecting inner strips, the inner strips pass across the subchannel having a high flow rate. This type of spacer grid is thus problematic in that it undesirably results in an increase in pressure loss.

On the other hand, U.S. Pat. No. 4,888,152 discloses a ring-type spacer grid that comprises a plurality of ducts shaped grid elements individually having a square cross-section. In order to form a spacer grid, the grid elements are slitted at appropriate portions and are intersected to each other in a way such that the grid elements form a grid structure arranged in pararell. Such a ring-type spacer grid does not pass across the subchannel different from the grids having the inner strips. However, this ring-type grid is problematic in that the fuel rods are placed and supported by rigid corners of the grid elements, thus being apt to be severely damaged when the fuel rods have vibrated.

As well known to those skilled in the art, there is a difference between the output powers of the fuel rods within a reactor core due to a nonuniform distribution of neutron flux. Therefore, a subchannel, adjacent to a fuel rod having a high thermal power output, may be highly increased in enthalpy comparing with the other neighboring subchannels. In accordance with an increase in the power output of the fuel rods, coolant in the subchannel having the high enthalpy rise, may be boiled prior to cooling within the other subchannels. There primarily occurs a nucleate boiling and secondarily a film boiling of water within the subchannel having the high enthalpy rise. When a film boiling occurs, a bubble film is formed on a fuel rod surface. Such a bubble film decreases heat transfer from the fuel rod surface to the coolant, thus increasing the temperature of the cladding surface of the fuel rod. Such an increased temperature of the cladding surface results in a partial thermal stress on the cladding. When the temperature of the cladding is further increased, both the cladding may be melted. It is thus necessary to limitedly operate the reactor core in a way such that any film boiling does not occur in the subchannels. Such an undesirable phenomenon, caused by film boiling in the subchannel, is a so-called "Departure from Nucleate Boiling (DNB)" in the field. The DNB is affected by the intervals between fuel rods, system pressure, thermal power output, enthalpy rise and core inlet coolant temperature. In order to allow a nuclear fuel assembly to output a high power while being free from such DNB, it is necessary to make a uniform temperature distribution of coolant within a nuclear reactor. When such a desired uniform temperature distribution of coolant is accomplished, the coolant is prevented from being partially overheated while maximizing the thermal output. Such a uniform temperature distribution of coolant may be accomplished by effectively mixing the coolant within each subchannel or between a plurality of subchannels of a fuel assembly. In order to mix the coolant within a fuel assembly as described above, a mixing vane, or an integrated mixing device, may be provided on the top of the strips of the spacer grid. The above mixing vane structure may be designed to cause a cross flow of coolant from a subchannel to a neighboring subchannel. Alternatively, the mixing vane structure may be designed to cause a swirling flow of coolant within a subchannel or around a fuel rod.

U.S. Pat. No. 4,879,090 discloses a typical vane structure for mixing the coolant within a nuclear fuel assembly. Another type of mixing vane structure for nuclear fuel assemblies may be referred to U.S. Pat. Nos. 5,299,245, 5,110,539 or 5,440,599. On the other hand, U.S. Pat. No. 4,726,926 discloses a specifically designed mixing device of the flow deflector type.

The mixing vane structure of U.S. Pat. No. 5,299,245 comprises four swirl flow vanes, which have a blade shape with a slitted end and are arranged within each subchannel. The four vanes of such a blade type are designed to swirl the coolant within a subchannel. However, this vane structure is problematic in that since the vane, arranged in the center of the subchannel, disturbs the smooth flow of coolant. This increases pressure loss in the fuel assembly. On the other hand, the mixing vane structure of U.S. Pat. No. 5,110,539 comprises two swirl flow vanes, which have a blade shape with a slitted end and are arranged in the center of each subchannel. The two vanes of such a blade type are designed to swirl the coolant within the subchannel. However, this vane structure is problematic in that the vanes may be easily damaged by fuel rod insertion. The mixing vane structure of U.S. Pat. No. 5,440,599 comprises two swirl flow vanes, which are laterally supported and are arranged within each subchannel. The two laterally supported vanes are designed to move coolant from a subchannel to a neighboring subchannel. However, this vane structure is problematic in that the lateral flow of coolant comes into collision with the main flow in subchannel, thus being disturbed by the main flow of coolant. This finally deteriorates the coolant mixing effect of the grid. The vane structure, disclosed in U.S. Pat. No. 4,726,926, comprises a plurality of flow deflector with a bent end. The flow deflectors are designed to move the coolant from gap channels, defined by the flow path between fuel rods, to the center of the subchannel. However, this flow deflector is problematic in that the deflected coolant comes into collision with coolant from an opposite deflector, thus reducing the coolant mixing effect caused by the cross flow.

SUMMARY OF THE INVENTION

Accordingly, the present invention has been made keeping in mind the above problems occurring in the prior art, and an object of the present invention is to provide a duct-type spacer grid for nuclear fuel assemblies, which consists of a plurality of duct-shaped grid elements individually having an octagonal cross-section capable of effectively resisting against a lateral impact, and which does not pass across a subchannel, thus reducing pressure loss.

Another object of the present invention is to provide a duct-type spacer grid for nuclear fuel assemblies, which effectively generates a swirl flow of water within subchannels, thus improving the thermal mixing performance of the fuel assembly.

A further object of the present invention is to provide a duct-type spacer grid for nuclear fuel assemblies, which supports each elongated fuel rod using line contact springs without using any dimple, thus uniformly distributing the spring force on the spring contact area of the fuel rod, thus almost completely preventing damage of the fuel rod due to a fretting wear.

In order to accomplish the above object, the present invention provides a duct-type spacer grid for placing and supporting a plurality of elongated fuel rods within a nuclear fuel assembly, comprising: a plurality of duct-shaped grid having an individual regular polygonal cross-section, the grid elements being closely arranged in parallel and assembled together to form a plurality of main flow paths between them, the main flow paths being used for allowing fuel rod coolant to pass through and having an individual polygonal cross-section, each of the grid elements including: a plurality of spring windows formed on a plurality of sidewalls of each polygonal grid element; a surface line spring provided within each of the spring windows while being bent toward the center of each grid element at a central portion thereof, thus elastically supporting an external surface of a fuel rod inserted into each grid element; and a plurality of swirl flow vanes axially extending from a top of each grid element and having different heights or the same height, each of the vanes being bent twice outwardly from each grid element toward the center of an associated subchannel and generating a swirl flow of coolant.

Each of the duct-shaped grid elements forms a main flow path thereby allowing coolant to pass through the main flow paths. The duct-shaped grid elements are arranged in parallel while forming a regular angle between them. The grid elements are, thereafter, welded together at their upper and lower area of wall and at one or more points at each of the upper and lower areas of the wall.

The line contact spring is bent thoroughly from the sidewall of each grid element toward the center of the grid element. The spring also forms a contact surface when it is brought into line contact with the external surface of the fuel rod. Each of the spring windows forms a passage used for allowing coolant to pass through, and is axially formed on an associated sidewall of each grid element while being parallel to the axis of the grid element, thus having a longitudinal shape.

Each of the swirl flow vanes is primarily bent outwardly to form a sub-blade and is secondarily bent outwardly to form a main-blade. The two blades are used for generating a swirl flow of coolant. The sub-blade is outwardly bent at an acute angle relative to the grid element, with the main blade being outwardly bent from the inclined portion of the sub-blade toward the center of an associated main flow path.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
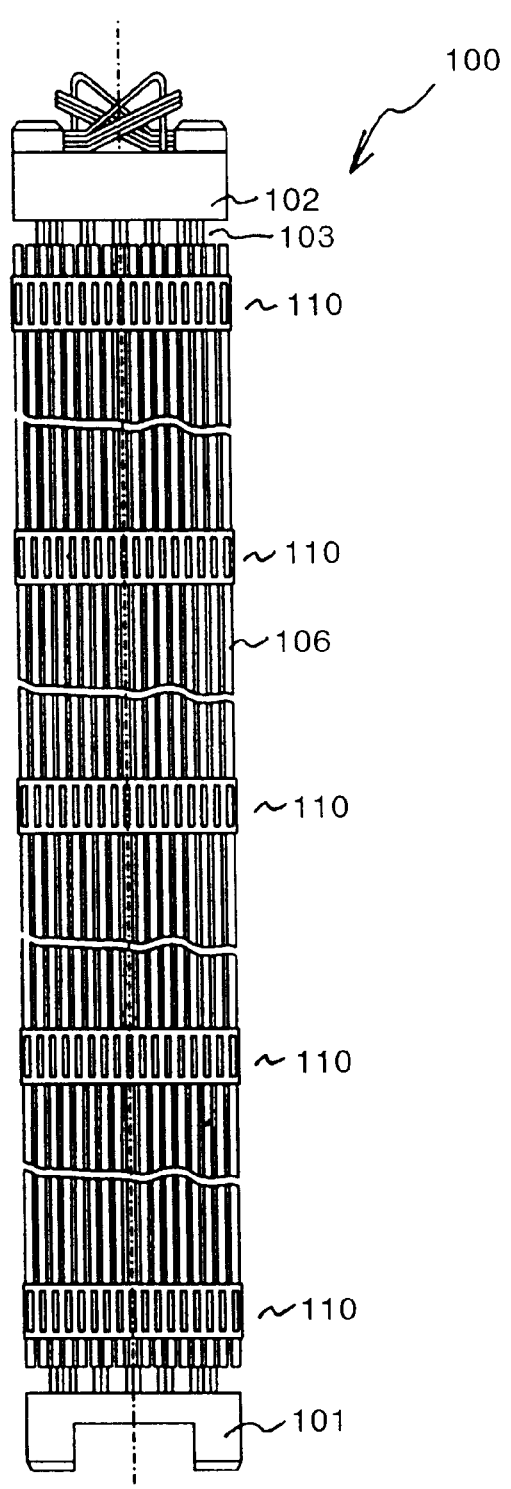
FIG. 1 is a perspective view of a conventional nuclear fuel assembly.
Figure 2:
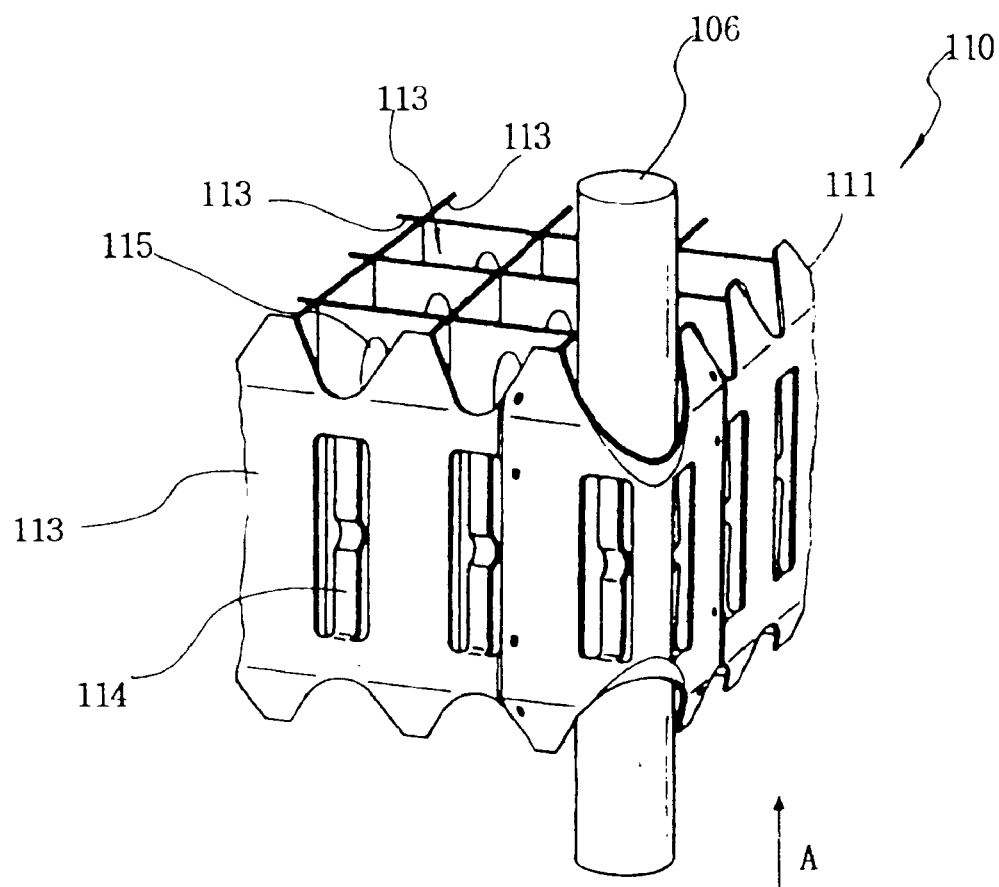
FIG. 2 is a perspective view of a conventional spacer grid used for placing and supporting a plurality of elongated fuel rods in the fuel assembly of FIG. 1.
Figure 3:
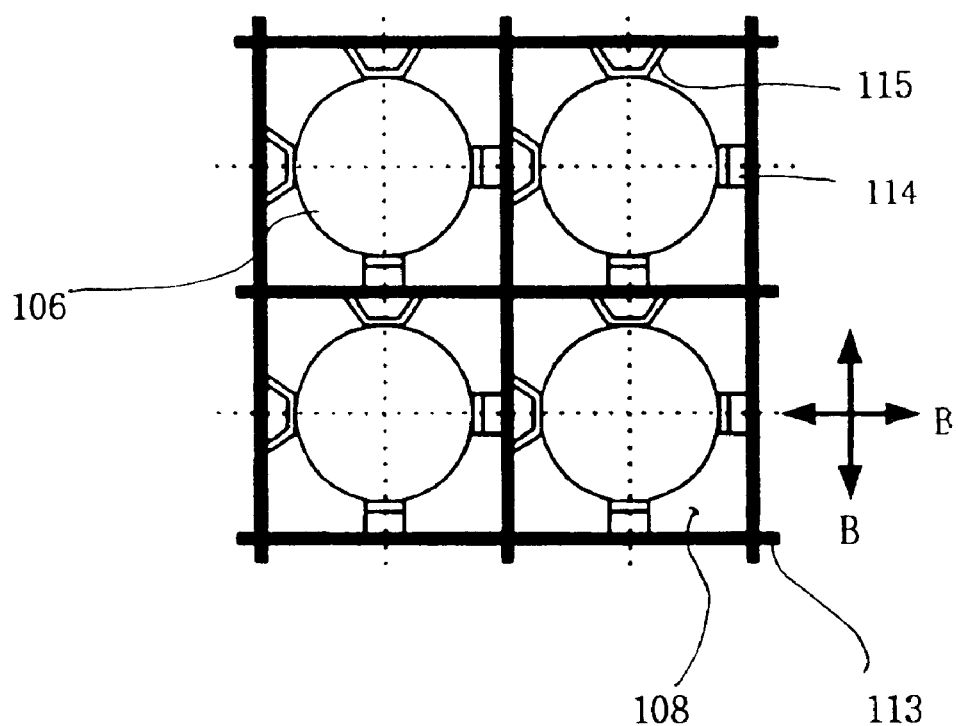
FIG. 3 is a plan view, showing a plurality of four-walled cells formed by a plurality of intersecting inner strips of the conventional spacer grid.
Figure 4:
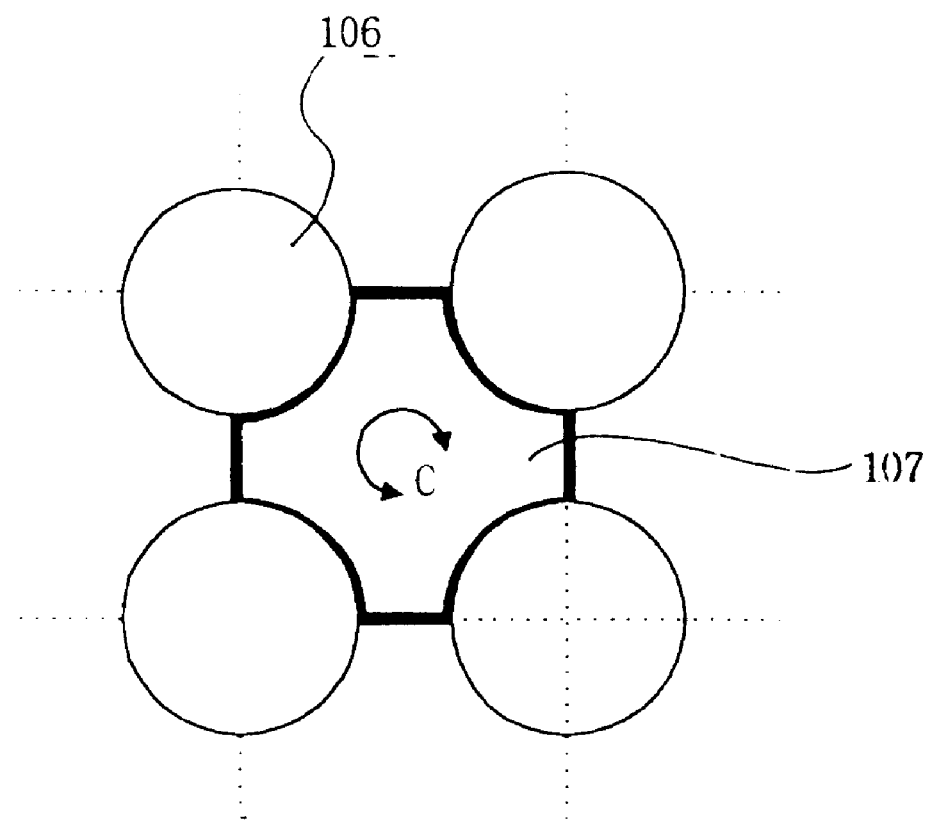
FIG. 4 is a plan view of a subchannel formed by four fuel rods within the conventional spacer grid.
Figure 5:
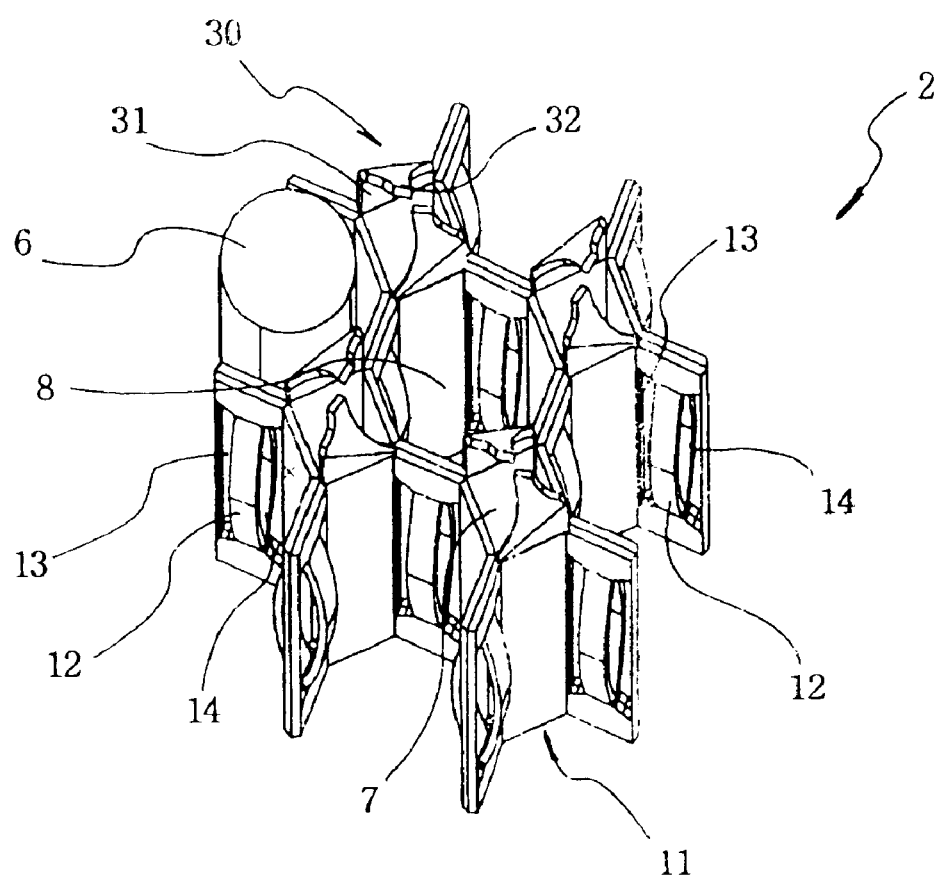
FIG. 5 is a perspective view of a duct-type spacer grid for nuclear fuel assemblies in accordance with the primary embodiment of the present invention.

FIG. 5 is a perspective view of a duct-type spacer grid for nuclear fuel assemblies in accordance with the primary embodiment of this invention. As shown in the drawing, the duct-type spacer grid 2 of this invention comprises a plurality of duct-shaped grid elements 11, individually provided with both a fuel rod support spring 12 of FIG. 8 and a swirl flow vane of FIG. 9.

The above spacer grid 2 is fabricated by horizontally and arranging in parallel the grid elements 11, each of which has an octagonal cross-section. In such a case, the grid elements 11 are welded together at the upper and lower area of the wall thereof. In the present invention, each of the grid elements 11 may be produced using a tube having an octagonal cross-section. Alternatively, each of the grid elements 11 may be made of a thin and narrow strip by forming the strip into a hollow single structure having an octagonal cross-section.

When the grid element 11 is made of an octagonal tube, the tube is machined through a pressing process so as to form a plurality of spring windows 13, 14, line contact springs 12, and swirl flow vanes 30 on the tube. On the other hand, when the grid element 11 is produced using a thin and narrow strip, the strip is primarily formed into a tube structure having an octagonal cross-section, thus forming a tube having a desired size. The tube is, thereafter, machined through a pressing process wherein a plurality of spring windows 13, 14, surface contact springs 12, and swirl flow vanes 30 are formed on the tube in the same manner as that described for the case of using an octagonal tube. After the pressing process, the tube is subjected to a welding process wherein the edges are welded and seamed together. A desired grid element 11 is thus completely produced.

The duct-type spacer grid 2, having a plurality of independent octagonal cells 8 within the grid elements 11, has an agreeable structure capable of more effectively resisting against a lateral impact in comparison with a conventional grid structure formed using the inner strips that intersect each other at right angles at the center of a subchannel 107. The reason why the duct-type grid 2 has such a structural advantage is as follows. That is, when the spacer grid 2 is geometrically designed to have a plurality of independent octagonal cells 8 as described above, the grid 2 more quickly and effectively transfers the lateral impact in every direction than in the case of a conventional strip-type spacer grid. Therefore, when the same lateral impact is applied to both types of spacer grids, the allowable impact load of the duct-type grid of this invention is remarkably greater than that of the conventional strip-type grid.

Figure 6:
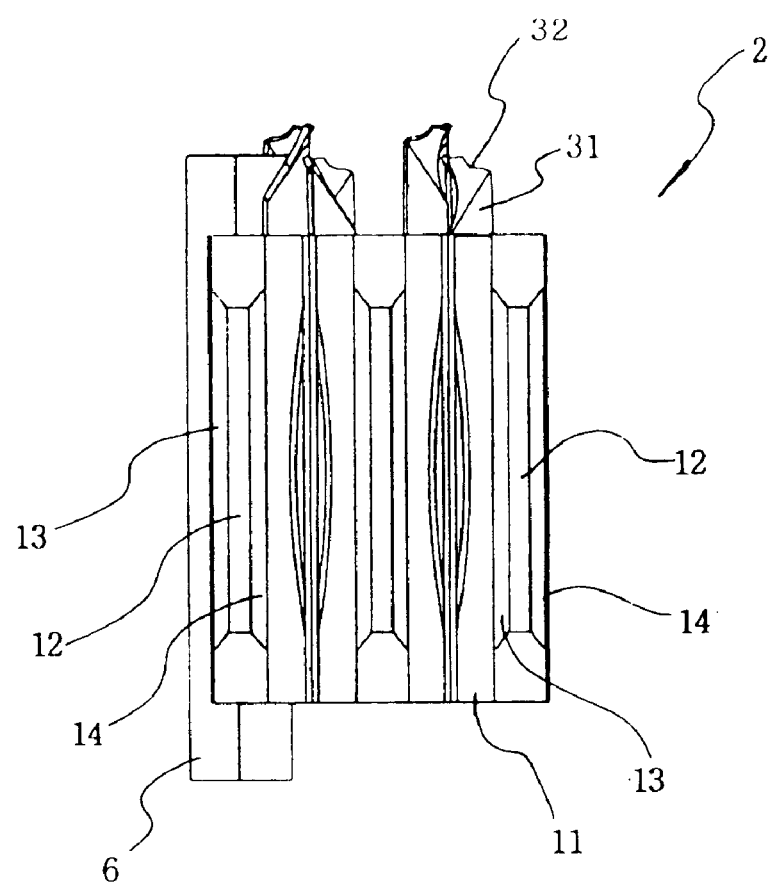
FIG. 6 is a front view of the duct-type spacer grid of FIG. 5.
Figure 7:
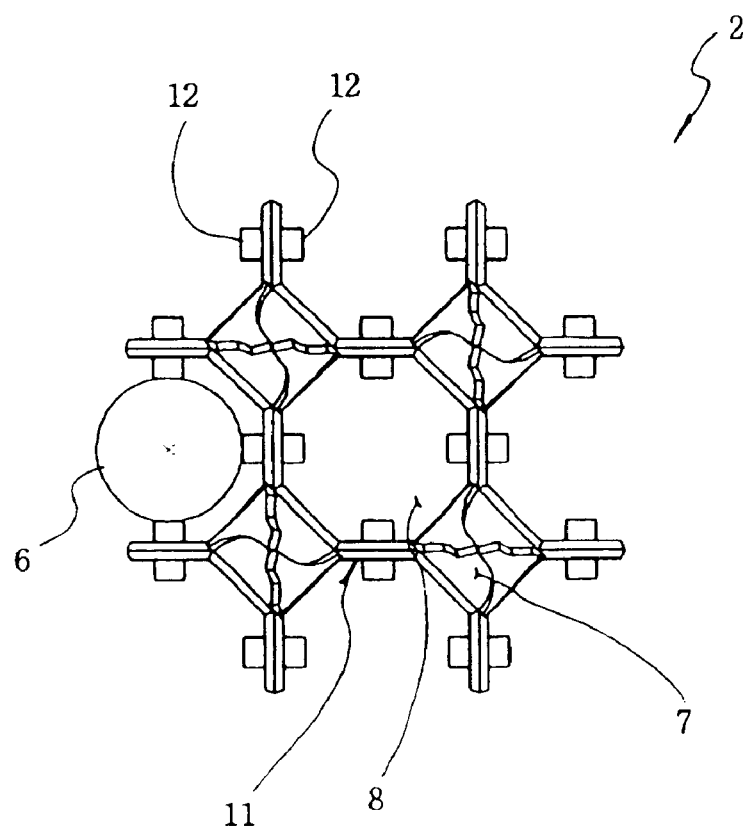
FIG. 7 is a plan view of the duct-type spacer grid of FIG. 5.

As shown in FIGS. 6 and 7, a plurality of longitudinal spring windows, or left- and right-side windows 13 and 14 are formed on the sidewall of each of the grid elements 11 through a pressing process, with a strip-shaped line contact spring 12 being left within each of the windows 13 and 14 while extending at the center of the window. The central portion of each spring 12 is bent toward the center of the grid element 11. The spring 12 thus elastically supports an elongated fuel rod 6 at the bulged portion when the fuel rod 6 is inserted into the cell 8 of the grid element 11. Within each grid element 11, four line contact springs 12 are formed on diametrically opposite four of eight sidewalls. Therefore, the four springs 12 uniformly apply the same spring force to the external surface of a fuel rod 6, inserted into the cell 8, while accomplishing a balance. The spring windows 13 and 14 are used as openings for allowing coolant to pass through so as to more effectively cool the fuel rods 6 within the spacer grid 2. A collateral objective of the windows 13 and 14 is to give additional flexibility to the springs 12.

Figure 8:
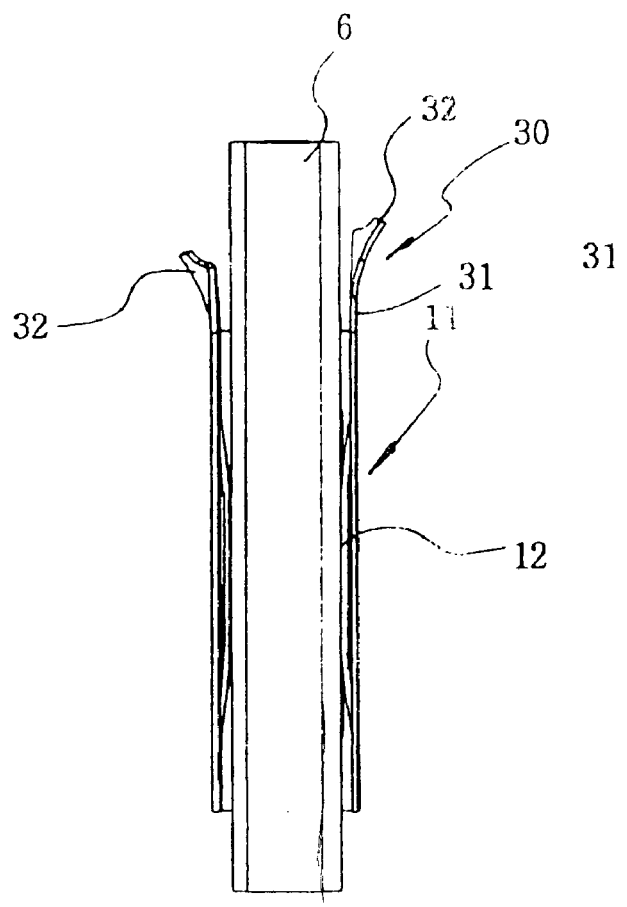
FIG. 8 is a view, showing a plurality of line contact springs used for elastically supporting a fuel rod inserted into a duct-shaped grid element of the spacer grid of FIG. 5.

FIG. 8 is a view, showing the operation of the springs 12 when they elastically support a fuel rod 6 within a grid element 11 of the spacer grid 2. When the springs 12 support the fuel rod 6 within the grid element 11, the springs 12 are brought into line contact with the external surface of the fuel rod 6. Therefore, the spring 12 is so-called a line contact spring. Since the springs 12 come into line contact with the fuel rod 6 as described above, the surface contact area of each spring 6 is increased, while contact pressure is applied from the spring 12 to the fuel rod 6. Therefore, it is possible for the spacer grid 2 of this invention to minimize surface damage of the fuel rods 6 due to fretting wear.

Figure 9:
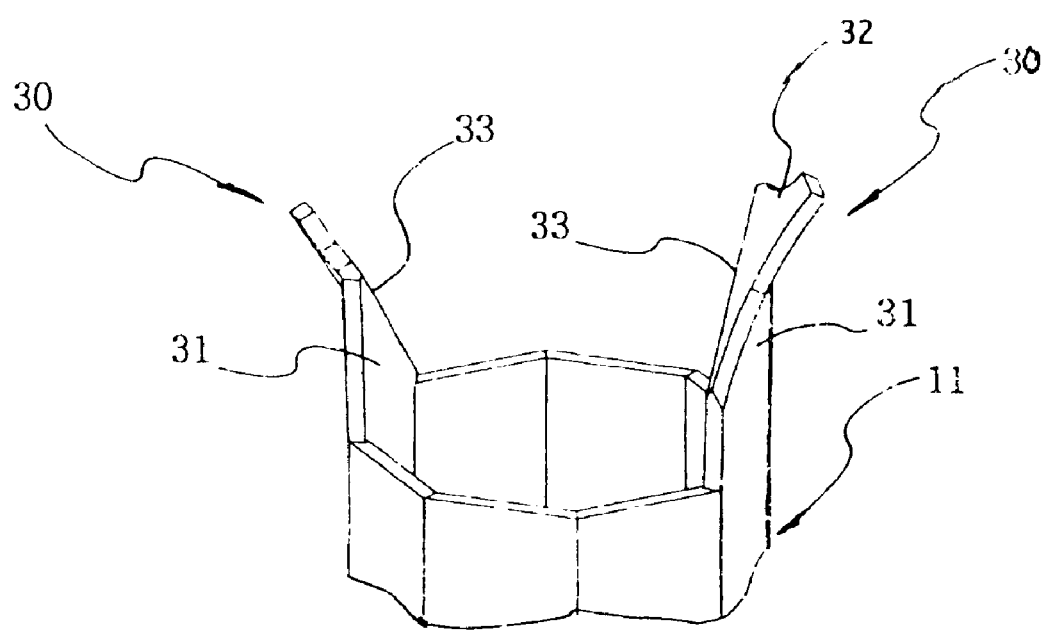
FIG. 9 is a perspective view, showing the upper portion of an octagonal grid element included in the spacer grid of FIG. 5, with two swirl flow vanes being provided at the top portion of the grid element.

FIG. 9 is a perspective view, showing the top portion of an octagonal grid element 11 included in the spacer grid of this invention, with two integral type swirl flow vanes 30 being provided at the top of the grid element 11. As shown in the drawing, each of the two vanes 30 comprises two blade parts: a main blade 31 and a sub-blade 32. Within each of the grid elements 11, the two vanes 30 are positioned to have different heights. In order to form each swirl flow vane 30 within a grid element 11, an extension part, integrally and axially extending from one sidewall of a grid element 11, is primarily bent toward the center of the main flow path 7, thus forming a sub-blade 32. Thereafter, the extension part is secondarily bent at the top of the sub-blade 32 toward the center of the main flow path 7, thus forming a main blade 31.

In the swirl flow vanes 30, each sub-blade 32 provides an inclined surface, at which the main blade 31 starts to extend. The sub-blade 32 maximizes the size of the main blade 31. The different heights of the flow vanes 30 within each grid element 11 are accomplished by the different heights of the sub-blades 32. As the sub-blades 32 have such different heights, the cross-sectioned area of the flow path gradually varies, thus reducing the pressure loss caused by the swirl flow vanes 30.

Figure 10:
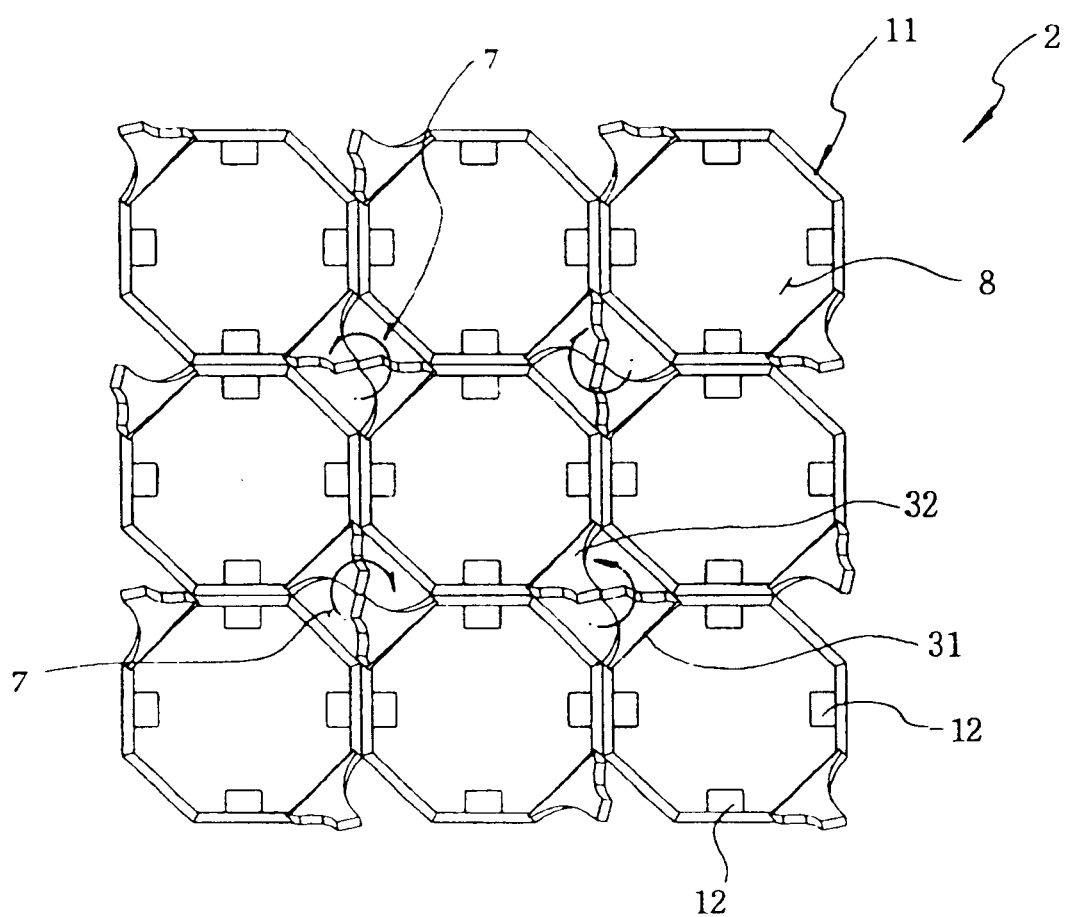
FIG. 10 is a plan view, showing the upper portion of the spacer grid of FIG. 5, with a plurality of swirl flow vanes being regularly arranged on the top of the grid.

FIG. 10 is a plan view, showing an arrangement of integral type swirl flow vanes provided at the top of the duct-type spacer grid 2 of this invention. As shown in the drawing, two swirl flow vanes 30 are provided within each main flow path 7 of the spacer grid 2. Since each of the vanes 30 is bent outwardly, the vanes 30 are almost completely free from being undesirably brought into contact with the fuel rods 6. In addition, the swirling directions of the vanes 30 provided at the main flow paths 7 of the grid 2 are designed as follows. That is, the swirl flow vanes 30, provided at the main flow paths 7 on a perpendicular arrangement, are designed in that their swirling directions are opposite to each other. However, the vanes 30, provided at the main flow paths 7 on a diagonal arrangement, are designed to have the same swirling direction.

Figure 11:
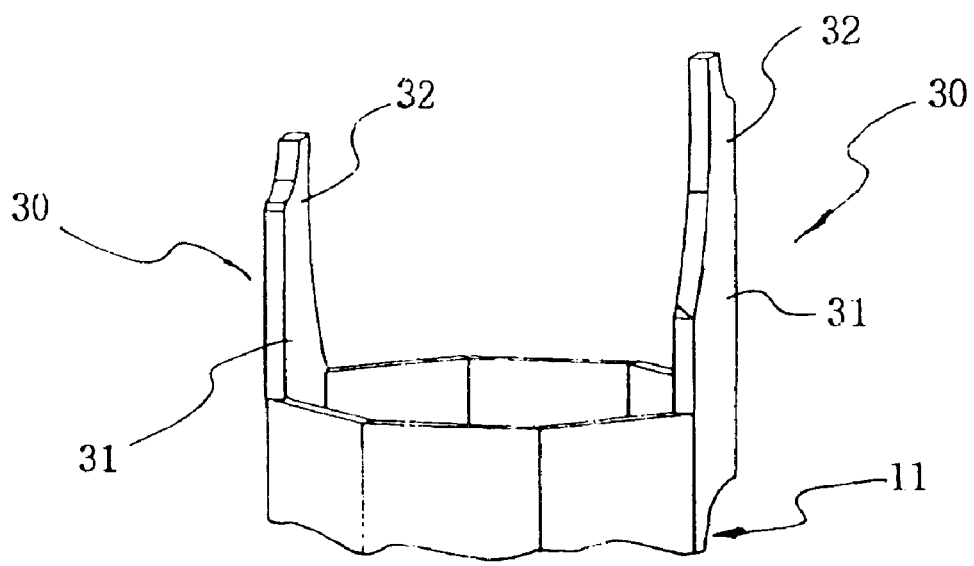
FIG. 11 is a perspective view, showing the upper portion of the octagonal grid element of FIG. 9, with the two swirl flow vanes prior to being bent to a desired configuration.

FIG. 11 is a perspective view, showing the two swirl flow vanes 30 before they are bent to a desired configuration. As shown in the drawing, each of the vanes 30 extends from a unit grid element 11 while forming a triangular plate shape having a specifically curved profile and/or a specifically bent linear profile at both edges. Of course, it should be understood that each of the vanes 30 may have another shape in place of the above-mentioned triangular shape and/or another edge profile in place of the above-mentioned profiles in accordance with a desired swirl flow.

The above duct-type spacer grid 2 has the following operational effect. That is, the grid element 11 of the spacer grid 2 comprises a duct having an octagonal cross-section, and so the grid element 11 does not pass across the center of the subchannel 107, through which coolant flows at a high speed. Therefore, the spacer grid 2 reduces pressure loss caused by the grid elements 11. Each of the grid elements 11 is formed as an independent cell 8 for placing and supporting an elongated fuel rod 6, thus having an improved resistance against a lateral impact applied to the sidewall of the grid 2.

Within each of the main flow paths 7 of the spacer grid 2, four swirl flow vanes 30 are axially positioned to have different heights, thus reducing pressure loss at the main blades 32 of the vanes 30. Since each of the main blades 32 of the swirl flow vanes 30 is bent outwardly from the cells 8, the main blades 32 are almost completely free from being undesirably brought into contact with the fuel rods 6 when the fuel rods 6 are inserted into the cells 8.

Figure 12:
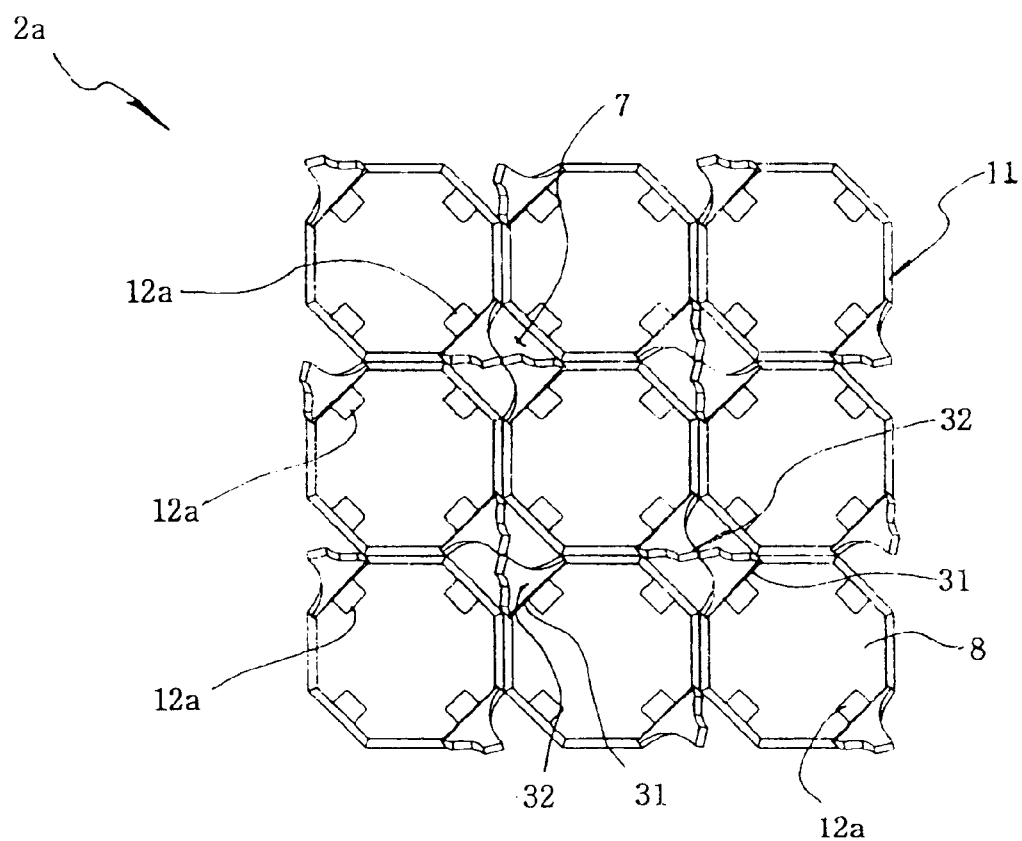
FIG. 12 is a perspective view of a duct-type spacer grid for nuclear fuel assemblies in accordance with the second embodiment of the present invention.

FIG. 12 is a perspective view of a duct-type spacer grid 2a for nuclear fuel assemblies in accordance with the second embodiment of this invention. In the spacer grid 2a of the second embodiment, the construction of both the duct-shaped grid elements 11 and the swirl flow vanes 30 remains the same as that described for the primary embodiment. But, the line contact springs 12a of the spacer grid 2a are positioned on the sidewalls around the main flow paths 7 different from the springs 12 of the primary embodiment.

Therefore, the spring windows 13 and 14 are positioned on said sidewalls around the main flow paths 7 in the second embodiment. This structure finally increases the amount of coolant flowing through the windows 13 and 14 since a large amount of coolant passes through the main flow paths 7. Therefore, the spacer grid 2a of this embodiment improves the cooling effect for the fuel rods 6 within the grid elements 11.

Figure 13:
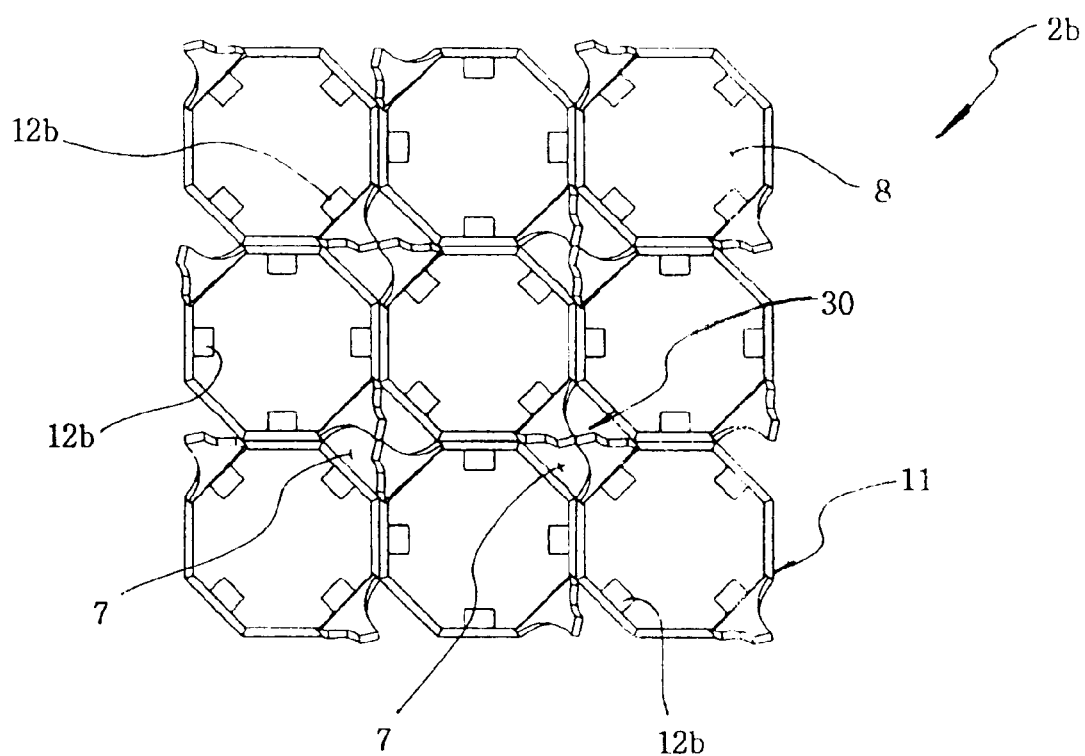
FIG. 13 is a perspective view of a duct-type spacer grid for nuclear fuel assemblies in accordance with the third embodiment of the present invention.

FIG. 13 is a perspective view of a duct-type spacer grid 2b for nuclear fuel assemblies in accordance with the third embodiment of this invention. In the spacer grid 2b of this embodiment, the construction of both the duct-shaped grid elements 11 and the swirl flow vanes 30 remains the same as that described for the primary embodiment. However, the arrangement of the line contact springs 12b of this embodiment is altered as follows. That is, the arrangement of the springs 12b of the neighboring grid elements 11 is rotated at an angle of 45° one by one. In other words, the arrangement of the springs 12b in the third embodiment is accomplished by alternately using the arrangements of the springs 12 and 12a of the primary and second embodiments.

Figure 14:
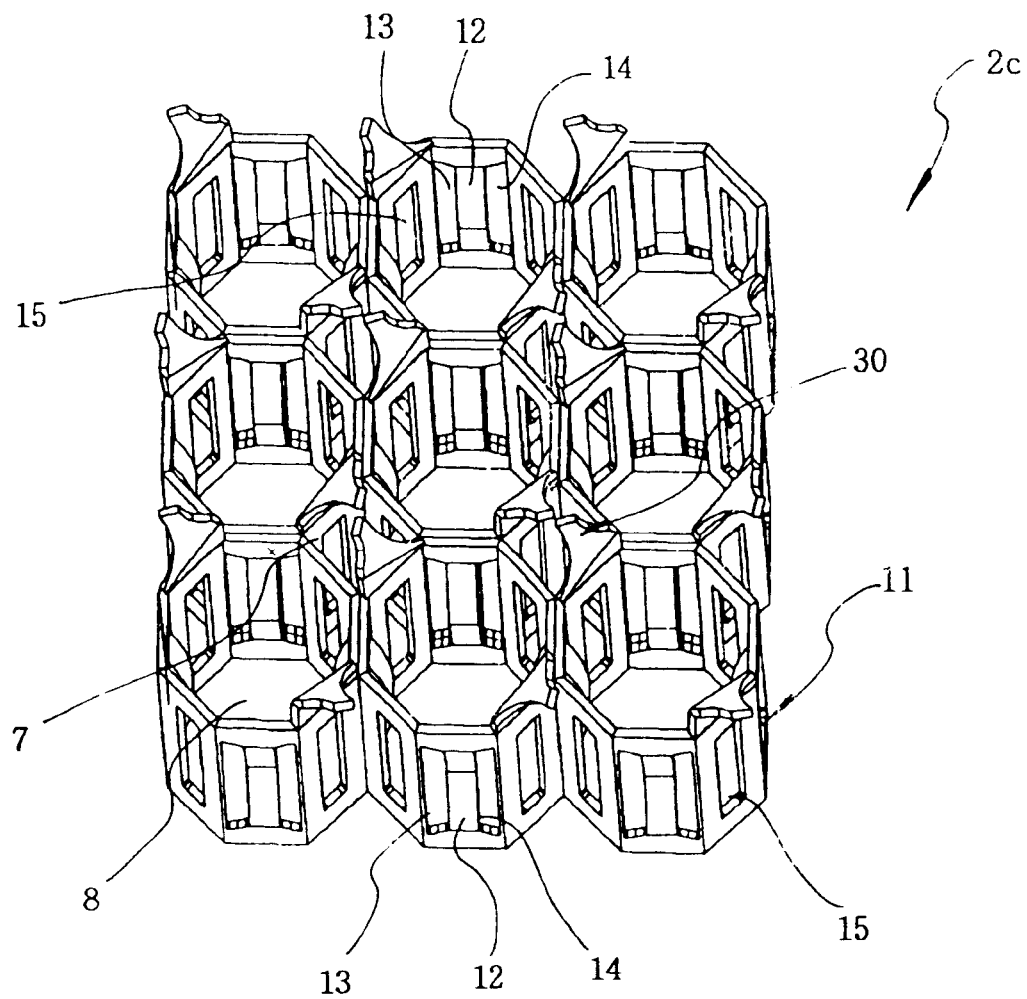
FIG. 14 is a perspective view of a duct-type spacer grid for nuclear fuel assemblies in accordance with the fourth embodiment of the present invention.

FIG. 14 is a perspective view of a duct-type spacer grid 2c for nuclear fuel assemblies in accordance with the fourth embodiment of this invention. In the spacer grid 2c of this embodiment, the construction of the duct-shaped grid elements 11, the swirl flow vanes 30, the line contact springs 12 and the spring windows 13 and 14 remains the same as that described for the primary embodiment. However, the spacer grid 2c of this embodiment further comprises a plurality of additional coolant flow windows 15. The additional windows 15 are formed on the sidewalls between the spring-provided sidewalls of each grid element 11. This structure increases the amount of coolant flow between the cells 8, thus improving the cooling effect for the fuel rods 6 within the grid elements 11.

As described above, the present invention provides a duct-type spacer grid for nuclear fuel assemblies. The spacer grid of this invention consists of a plurality of duct-shaped grid elements individually having an octagonal cross-section.

The grid elements are closely arranged in parallel into a matrix structure prior to being welded together. In the spacer grid, the duct-shaped grid elements do not pass across the center of the subchannel 107, through which coolant flows at a high speed. Therefore, the spacer grid of this invention effectively reduces pressure loss caused by the grid elements. Each of the grid elements is formed as an independent cell effectively resisting against a lateral impact applied to the sidewall of the grid.

In the duct-type spacer grid of this invention, two swirl flow vanes are axially positioned to have different heights within each subchannel 107. The swirl flow vanes thus reduce pressure loss at their main blades. In addition, since each of the main blades of the swirl flow vanes is bent outwardly from the cells, the main blades are almost completely free from being undesirably brought into contact with fuel rods when the fuel rods are inserted into the cells.

Another advantage of this invention resides in that each elongated fuel rod is supported within a cell by line contact springs without using any dimple, with the surface contact springs being positioned at the same height. The spacer grid of this invention thus uniformly distributes its spring force on the spring contact area of each fuel rod, and so it almost completely prevents damage of the fuel rod due to fretting wear.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A duct-type spacer grid for placing and supporting a plurality of elongated fuel rods within a nuclear fuel assembly, comprising:

a plurality of duet-shaped grid elements individually having a plurality of elongated sidewalls which form a polygonal cross-section, said grid elements being closely arranged in parallel and assembled together to form a plurality of main flow paths of polygonal cross-section for allowing coolant to pass, each of said grid elements comprising:

a plurality of the plurality of sidewalls having spring windows and at least four of the plurality of sidewalls without spring windows;

a line contact spring provided on each of said spring windows and being bent toward the center of each grid element at a central portion thereof, for supporting an external surface of a fuel rod in each grid element; and a plurality of integral swirl flow vanes of different heights axially extending from a top surface of each sidewall having spring windows, each of said vanes being bent twice outwardly from each grid element toward the center of an associated flow path for generating a swirl flow of coolant.

2. A duct-type spacer grid according to claim 1, wherein said polygonal cross-section of each of the duct-shaped grid elements is an octagonal cross-section.

3. The duct-type spacer grid according to claim 2, wherein the sidewalls having spring windows adjacent polygonal grid elements form a main flow path for coolant to pass through.

4. The duct-type spacer grid according to claim 2, herein said duct-shaped grid elements are arranged parallel while forming a regular angle between them, said grid elements being welded together at an upper and lower area of the sidewall and at one or more points at each of said upper and lower area of the sidewall.

5. The duct-type spacer grid according to claim 1, wherein said line contact spring is bent thoroughly from the sidewall of each grid element toward the center of the grid element, said spring forming a flat contact surface when brought into line contact with the external surface of the fuel rod.

6. The duct-type spacer grid according to claim 1, wherein each of said spring windows forms a flow path used for allowing coolant to pass through.

7. The duct-type spacer grid according to claim 1, wherein each of said spring windows is axially formed on an associated sidewall of each grid element while being parallel to the axis of the grid element, thus having a longitudinal shape.

8. The duct-type spacer grid according to claim 1, wherein each of said swirl flow vanes is primarily bent outwardly to form a sub-blade and is secondarily bent outwardly to form a main-blade, said two blades being used for generating a swirl flow of coolant effectively.

9. The duct-type spacer grid according to claim 8, wherein said sub-blade is outwardly bent at an acute angle relative to the grid element, with said main blade being outwardly bent from an inclined portion of said sub-blade toward the center of an associated main flow path.

10. The duct-type spacer grid according to claim 1, wherein said swirl flow vanes are provided within each of the main flow paths in the form of a pair, said vanes having the same height or a different height in an axial direction.

\* \* \* \* \*

UNITED STATES PATENT AND TRADEMARK OFFICE
CERTIFICATE OF CORRECTION

PATENT NO.     : 6,608,881 B2
DATED          : August 19, 2003
INVENTOR(S)    : Dong-Seok Oh et al.

It is certified that error appears in the above-identified patent and that said Letters Patent is hereby corrected as shown below:

Column 9,
Line 27, "duet" should be corrected to the word -- duct --.

Column 10,
Line 11, "herein" should be corrected to -- wherein --.

Signed and Sealed this

Twenty-third Day of December, 2003

JAMES E. ROGAN
*Director of the United States Patent and Trademark Office*